Patented Apr. 12, 1927.

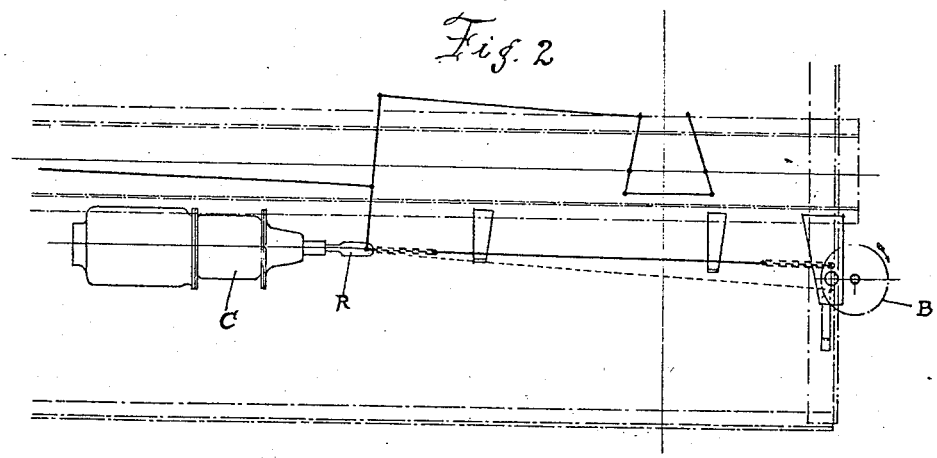
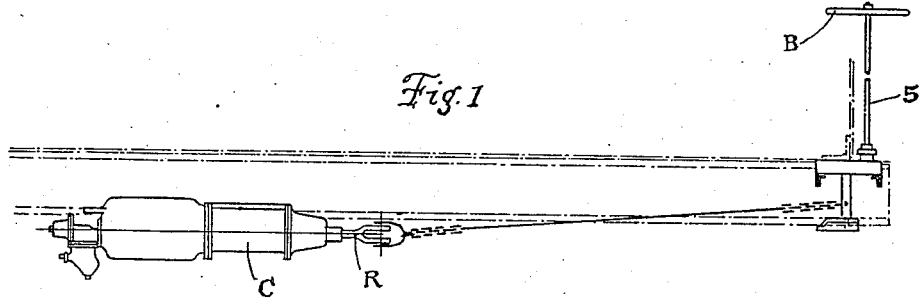

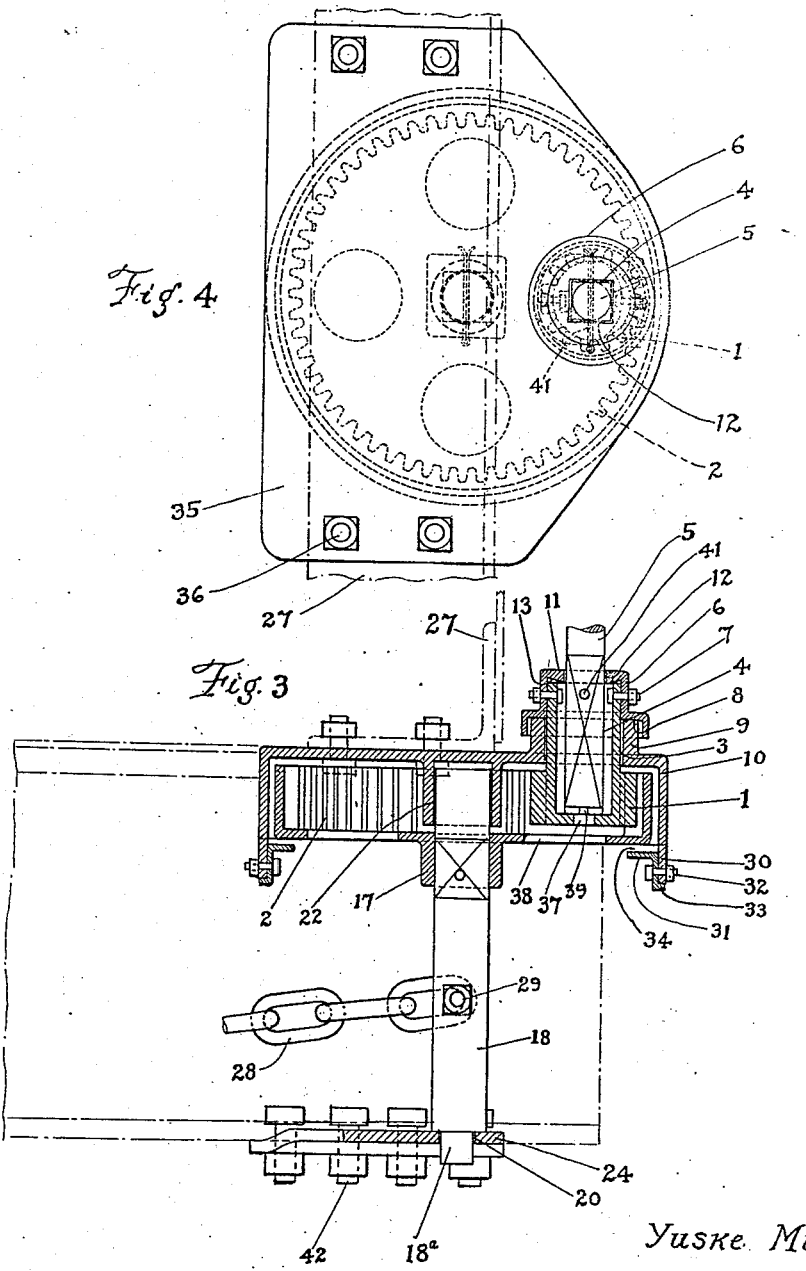

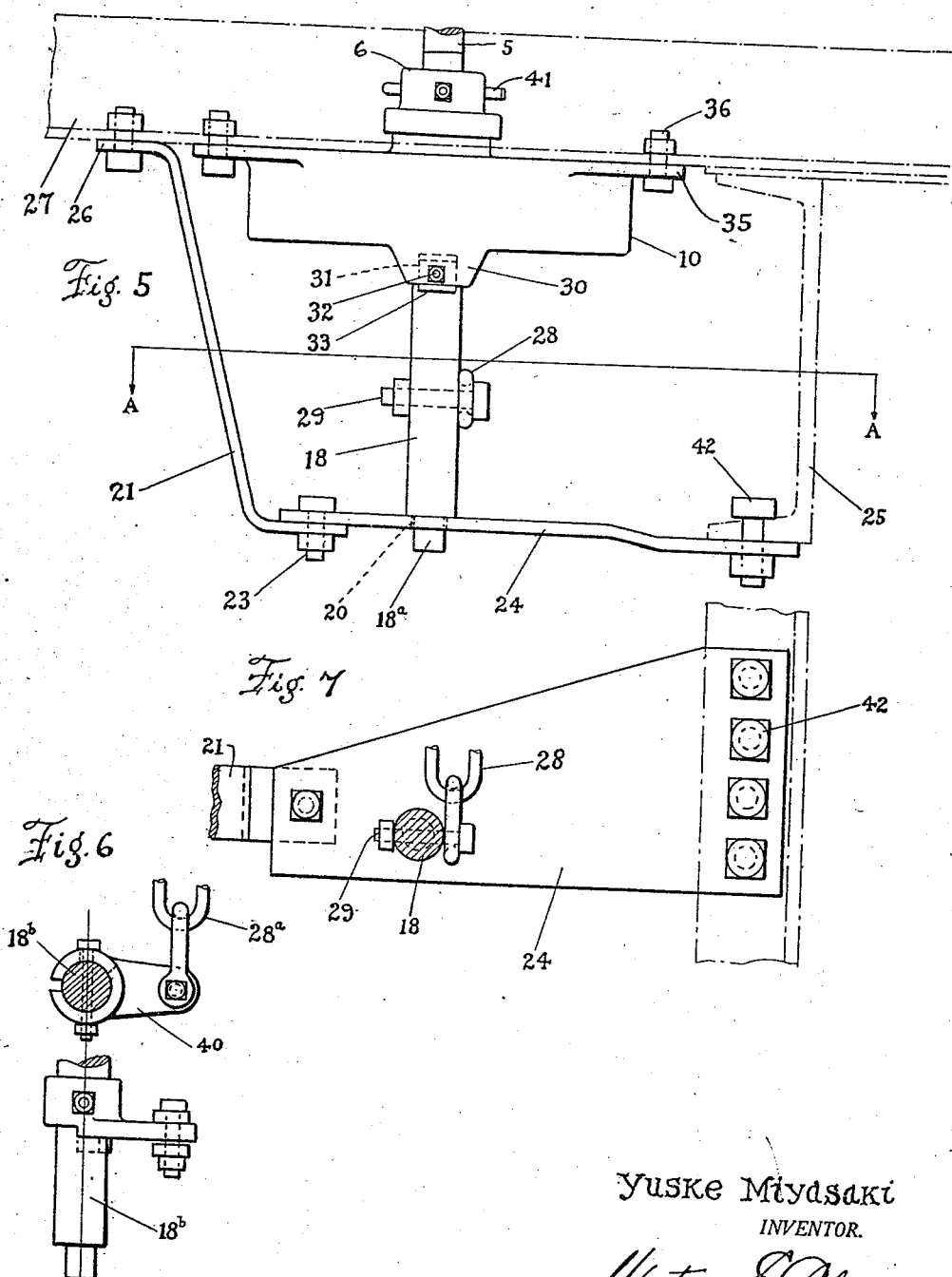

1,624,425

UNITED STATES PATENT OFFICE.

YUSKE MIYASAKI, OF KANSAS CITY, MISSOURI.

HAND-BRAKE MECHANISM FOR RAILWAY CARS.

Application filed July 23, 1926. Serial No. 124,508.

This invention relates to hand brake mechanisms for railway cars and it is an object of the invention to provide a mechanism of this kind adapted to be interposed between a hand brake wheel and an air brake cylinder whereby when hand turning force is applied to the brake wheel it will develop a power at the brake cylinder, or at the starting point of the entire brake system, equal to the total air pressure on the brake cylinder piston.

It is also an object of the invention to provide a mechanism of this kind operating to obtain by means of a pinion and gear wheel a hand brake power equal to air brake power or to develop a pulling power at the push rod in the air brake cylinder equal to the total air pressure on the cylinder piston.

Another object of the invention is to provide a mechanism of this kind embodying means whereby the coacting pinion and gear wheel are effectively protected against the weather and particularly to prevent water entering the spaces therebetween or in the associated bearings which, during the winter months, would be likely to freeze and thereby materially interfere with the operation of the mechanism.

An additional object of the invention is to provide a mechanism of this kind comprising a housing and a coacting pinion and gear wheel, the pinion being suspended from the housing and the gear wheel supported thereby in a manner whereby such mechanism constitutes a unit eliminating lower bearings.

Furthermore, it is an object of the invention to provide a mechanism of this kind including a winding shaft having the brake chain located on the center sill side of the shaft, when the hand brake is applied, so as to bring the center line of the brake chain at the shaft and the center line of the brake cylinder as close as possible in order to decrease the loss of pulling force of the chain which would occur upon undue eccentricity of such center lines.

The invention consists in the details of construction and in the combination and arrangement of the several parts of my improved hand brake mechanism for a railway car whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation and of a diagrammatic character illustrating a mechanism constructed in accordance with an embodiment of my invention;

Figure 2 is a fragmentary view in top plan and of a diagrammatic character illustrating certain features of the mechanism as herein embodied;

Figure 3 is an enlarged fragmentary view partly in section and partly in elevation of the mechanism as herein embodied;

Figure 4 is a view in top plan of the structure as illustrated in Figure 1;

Figure 5 is a view in front elevation of the structure as illustrated in Figure 3;

Figure 6 is a fragmentary view partly in section and partly in plan illustrating a further embodiment of the mechanism.

Figure 7 is a sectional view taken on the line a—a of Figure 5.

As disclosed in the accompanying drawings, 1 denotes a pinion meshing with an internal gear wheel 2. The pinion 1 has extending axially therefrom a cylindrical trunnion or bearing 3 provided inside with a socket 4 angular in cross section and which snugly receives the lower end portion of the brake shaft 5. The upper or outer end of the trunnion or bearing 3 has applied thereto a cap 6 held in position by the bolts 7 directed through the overlapping or vertical portions of the walls of the trunnion or bearing 3 and the cap 6. The cap 6 rests or has direct contact with the outer end 8 of the outstanding tubular trunnion 9 carried by the housing 10 and through which the trunnion or bearing 3 is directed from within. The lower or inner portion of the cap 6 overlaps the trunnion 9 as is particularly illustrated in Figure 3.

The top 11 of the cap 6 is provided at its axial center with an angular opening 12 of a size sufficient to permit the lower portion of the shaft 5 to be readily engaged within the socket 4 of the bearing or trunnion 3.

The under or inner portion of the top 11 of the cap 6 is provided with a sloped surface 13 so that water passing through the clearance in the top 11 of the cap surrounding the adjacent portion of the shaft 5 will be received within the bearing or trunnion 3 and be prevented from passing between the cap 6 and the bearing or trunnion 3 and down between said bearing or trunnion 3 and the trunnion 9 to the pinion 1 and gear 2. This is of advantage as it eliminates the liability of ice being formed upon such pinion and gear which would materially interfere with the effective operation thereof.

The gear 2 at its axial center is provided with a bearing or trunnion 17 the bore of which being angular in cross section and which snugly receives the upper end portion of a winding shaft 18. A pin 19 is inserted through the trunnion 17 and the shaft 18 whereby such elements are effectively locked together for unitary rotation.

The lower end of the shaft 18 is provided with a reduced extension 18ª which is received within an opening 20 provided in the end portion of bracket or support 24.

The shaft 18 extends above the trunnion 17 and such extended portion is cylindrical in form and is received within a depending cylindrical bearing 22 provided at substantially the axial center of the housing 10 and disposed inwardly of the gear 2.

One end portion of the yoke 21 is secured by the bolts 23 or the like to a bracket 24 suitably positioned on the center sill 25 of the car structure. The opposite end portion of the yoke 21 is bolted, as at 26, to the end sill 27 of the car. The bracket is secured to the center sill by the bolts 42.

A brake chain 28 is secured to the winding shaft 18 by the bolt 29.

As the pinion 1 is engaged internally of the gear 2 both the pinion and gear will rotate in the same direction, the gear 2 being driven by the pinion 1. When the brake wheel B turns clockwise the shaft 5, the pinion 1 and gear 2 and the winding shaft 18 will also turn clockwise, bringing the chain 28 on the center sill side of the shaft 18 when the winding begins. In other words, facing the end of the car, the chain 28 will be on the right hand side of the shaft 18. Generally, the center line of the brake cylinder C, or the push rod R with which the pulling force of the chain coacts, is located between the winding shaft and the center sill of the car. Therefore, by having the brake chain 28 on the center sill side of the winding shaft 18 the center line of the brake chain 28 will be brought closer to the center line of the brake cylinder C or push rod R. The closer such center lines the less loss of pulling force of the brake chain, the maximum efficiency being obtained when such center lines are coplanar (Figure 2).

The torque or twisting movement in the winding shaft 18 is equal to the torque in the brake shaft 5 divided by one-half pitch diameter of the pinion 1 multiplied by one-half pitch diameter of the gear 2 and the torque in the winding shaft 18 is proportional to the pulling force of the brake chain 28. It is, therefore, possible to increase the torque of the winding shaft 18 to any desired amount to develop a required tension or pull in the chain by changing the ratio of the pitch diameter of the pinion 1 to the pitch diameter of the gear 2 when the torque in the brake shaft 5 is given.

The housing 10 is provided with depending flanges 30 to which are attached the clips or brackets 31 through the medium of the bolts 32. A lip 33 is formed on each of the brackets 31 which closely engages the under edge of the associated flange 30 so that the bracket will not turn in case the bolt 32 becomes loose.

The brackets 31 prevent the gear 2 from disengaging the pinion and hold the entire mechanism in one unit prior to the application of the mechanism to the car. A sufficient clearance 34 is provided so that the gear 2 will not ride on the brackets 31 when the mechanism is in applied position as the lower end of the winding shaft 18 will rest or bear on the bracket or support 24.

With the pinion 1 suspended from the housing 10 and the gear wheel 2 supported by the brackets 31, lower bearings for the pinion and gear are not required, thereby greatly simplifying the construction of the housing.

By having the pinion 1 internally geared with the gear 2, the size of the housing is materially reduced with a resultant reduction in weight.

The housing 10 is also provided in its upper part with the outstanding flanges 35 whereby the housing through the medium of the bolts 36 may be effectively anchored to the end sill 27.

The water received within the bearing or trunnion 3 will drain out through an opening 37 at the axial center of the pinion 1 in communication with the socket 4 and also through the openings 38 in the gear 2.

A lug 39 extending from a margin of the opening 37 to a wall of the socket 4 is provided so that the lower or inserted end of the shaft 5 will rest on the lug 39 and not close the drain opening 37.

The under surface 13 of the top 11 of the cap 6 preferably fits tight against the top or outer end of the bearing or trunnion 3.

As illustrated in Fig. 6, the chain 28ª is secured to a bracket 40 connected to the winding shaft 18ª. By this means the chain 28ª is indirectly attached to the winding shaft 18ᵇ and thus permits the bracket 40 to quickly take up slack in the chain 28ª upon initial turning movement of the shaft 18ª. This is accomplished on account of the increased distance between the center of the shaft 18ª and the chain 28ª.

In practice, the unit of the mechanism is first secured to the end sill 27 so that the center line of the brake shaft 5 will line up with the center line of the pinion 1. Then the bracket or support 24 is applied so that it will permit free rotation of the winding shaft 18. The lower end of the brake shaft 5 is then dropped into the socket 4 and a cotter pin 41 or the like is then applied to prevent the brake shaft 5 from rising.

When the hand brake is applied, the reaction of the pulling force in the brake chain will act at the opening 20 in the bracket 24 and pull the bracket towards the brake cylinder. It is essential, due to reaction of pull in the chain, that a deflection of the bracket at the lower end of the winding shaft for a mechanism of this character is reduced to a minimum. In case the lower end 18ª of the winding shaft moves, due to the deflection, in a direction at right angles or angularly to the longitudinal center line of the winding shaft, the upper end portion of the winding shaft tends to bind at the receiving hole in the trunnion 22 of the housing and will interfere with the efficient operation of the mechanism. As the bracket is applied with the flat surface almost parallel with the direction of the pulling force, a most economical section of the bracket will be obtained for bending, having the reaction of the turning moment at the center sill, and it is possible to carry effectively the entire reaction due to tension in the brake chain at the bottom of the winding shaft by the bracket 24 and the center sill 25, using comparatively a small amount of material. Thus the deflection of the bracket will be greatly reduced compared with a support for the winding shaft in which the support is secured to the end sill and designed to have the reaction carried by the end sill which generally requires a bracing means to withstand the stress, by employing an equal amount of material.

Generally the height from rail to the chain at the winding shaft is greater than the height from rail to the push rod to which the brake chain is indirectly connected. This will make the brake chain slope down toward the brake cylinder; therefore the vertical component force of the tension in the brake chain tends to push the bracket downwardly at the bottom of the winding shaft. To withstand this stress, one end of the bracket is supported by the yoke 21 and is hanged from the end sill.

From the foregoing description it is thought to be obvious that a hand brake mechanism for a railway car constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:—

1. A hand brake mechanism comprising, in combination, a housing provided with an outstanding tubular bearing, a pinion within the housing having a trunnion extending through the bearing of the housing, a cap secured to the trunnion of the pinion and contacting with the outer end of the bearing of the housing, the top of the cap having contact with the outer end of the trunnion of the pinion, a brake shaft extending through the cap and engageable with the pinion, a gear within the housing meshing with the pinion, and a winding shaft rotatable with the gear, the under surface of the top of the cap sloping toward the brake shaft so that moisture passing through the clearance of the cap surrounding the adjacent portion of the brake shaft will be received within the trunnion.

2. A hand brake mechanism comprising, in combination, a housing provided with an outstanding tubular bearing, a pinion within the housing having a trunnion extending through the bearing of the housing, a cap secured to the trunnion of the pinion and contacting with the outer end of the bearing of the housing, the top of the cap having contact with the outer end of the trunnion of the pinion, a brake shaft extending through the cap and engageable with the pinion, a gear within the housing meshing with the pinion, and a winding shaft rotatable with the gear, the lower portion of the cap telescopically receiving the bearing of the housing.

3. A hand brake mechanism comprising, in combination, a housing provided with an outstanding tubular bearing, a pinion within the housing having a trunnion extending through the bearing of the housing, a cap secured to the trunnion of the pinion and contacting with the outer end of the bearing of the housing, the top of the cap having contact with the outer end of the trunnion of the pinion, a brake shaft engageable with the pinion, a gear within the housing meshing with the pinion, a winding shaft rotatable with the gear, the trunnion of the pinion having a socket in which the brake shaft engages, the pinion having a drain opening in communication with the lower portion of the socket, and means within the socket to space the inserted end of the brake shaft from the bototm of the socket.

4. A hand brake mechanism comprising, in combination with a car body, a housing, a gear supported within the housing, said housing having a top wall provided with a depending bearing extending inwardly of the gear, a pinion within the housing meshing with the gear, a brake shaft engageable with the pinion, and a winding shaft rotating with the gear, the upper end of the winding shaft engaging the depending bearing and the lower end of said winding shaft carried by the car body.

5. A hand brake mechanism comprising, in combination, with the end sill and center sill of a car body, a housing, a gear within the housing, a pinion meshing with the gear, a winding shaft, a brake shaft engageable with the pinion, means for securing the housing to the end sill, a bracket carried by the lower portion of the center sill, the lower end of the winding shaft being directly supported by the bracket, and a brake chain secured to the winding shaft, the bracket coacting with the lower end of the winding shaft to carry the entire horizontal reaction at the lower portion of the shaft due to tension of the chain, said bracket being also engageable with the end sill to carry the vertical component of said tension.

6. A hand brake mechanism comprising, in combination, a housing provided with an outstanding tubular bearing, a pinion within the housing having a trunnion extending through the bearing of the housing, a cap carried by the trunnion of the pinion engaging the bearing of the housing, a gear within the housing meshing with the pinion, inwardly disposed members carried by the housing for holding the gear within the housing, the lower end portion of the cap overlying and extending below the top of the tubular bearing, a brake shaft engageable with the pinion, and a winding shaft rotating with the gear.

7. A hand brake mechanism comprising, in combination, a housing provided with an outstanding tubular bearing, a pinion within the housing having a trunnion extending through the bearing of the housing, a cap carried by the trunnion of the pinion and telescopically receiving the bearing of the housing, a brake shaft engageable with the pinion, a gear within the housing meshing with the pinion, and a winding shaft rotatable with the gear.

In testimony whereof I hereunto affix my signature.

YUSKE MIYASAKI.